(12) United States Patent
Wang (10) Patent No.: US 10,010,811 B2
(45) Date of Patent: Jul. 3, 2018

(54) EVAPORATION-CONDENSATION SYSTEMS AND METHODS FOR THEIR MANUFACTURE AND USE

(71) Applicant: EMPIRE TECHNOLOGY DEVELOPMENT LLC, Wilmington, DE (US)

(72) Inventor: Hao Wang, Beijing (CN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 181 days.

(21) Appl. No.: 14/894,897

(22) PCT Filed: May 28, 2013

(86) PCT No.: PCT/CN2013/076304
§ 371 (c)(1),
(2) Date: Nov. 30, 2015

(87) PCT Pub. No.: WO2014/190478
PCT Pub. Date: Dec. 4, 2014

(65) Prior Publication Data
US 2016/0121237 A1    May 5, 2016

(51) Int. Cl.
*B01D 5/00* (2006.01)
*B01D 1/26* (2006.01)
(Continued)

(52) U.S. Cl.
CPC .............. *B01D 5/009* (2013.01); *B01D 1/16* (2013.01); *B01D 1/22* (2013.01); *B01D 1/221* (2013.01);
(Continued)

(58) Field of Classification Search
CPC .......... B01D 1/225; B01D 1/221; B01D 1/16; B01D 5/006; B01D 5/009; B01D 5/0066;
(Continued)

(56) References Cited

U.S. PATENT DOCUMENTS 2,538,540 A * 1/1951 Thurman ................. B01D 1/22
165/110
2,823,742 A * 2/1958 Fritz .................... B01D 1/2887
159/15

(Continued)

FOREIGN PATENT DOCUMENTS

CN    1048262 A    1/1991
CN    2139846 Y    8/1993
(Continued)

OTHER PUBLICATIONS

FR2452302A1 ENG [Menguy, G. (1980). Espacenet translation obtained Oct. 5, 2017].*
(Continued)

*Primary Examiner* — Jonathan Miller
*Assistant Examiner* — Gabriel E Gitman (57) ABSTRACT

An evaporation-condensation system and methods of manufacturing and using the same are disclosed. The system may include a condensation surface having one or more wipers and a gas diffusion apparatus. The one or more wipers may be configured to move over the condensation surface to displace one or more of fouling material and condensed material that may be present on the condensation surface. The gas diffusion apparatus may include one or more anti-gas blades positioned substantially parallel to the condensation surface and one or more gas storage areas. The gas diffusion apparatus may be configured to guide an amount of vapor molecules towards the condensation surface and promote condensation of the vapor molecules by rotating the one or more anti-gas blades around a central axis and
(Continued)

displacing an amount of non-condensable gas into the one or more gas storage areas.

23 Claims, 8 Drawing Sheets (51) Int. Cl.
| | |
|---|---|
| B01D 1/22 | (2006.01) |
| C02F 1/08 | (2006.01) |
| B01D 1/16 | (2006.01) |
| C02F 1/04 | (2006.01) |
| C02F 1/12 | (2006.01) |
| C02F 103/08 | (2006.01) |

(52) U.S. Cl.
CPC .............. *B01D 1/225* (2013.01); *B01D 1/26* (2013.01); *B01D 5/006* (2013.01); *B01D 5/0015* (2013.01); *B01D 5/0066* (2013.01); *B01D 5/0078* (2013.01); *C02F 1/042* (2013.01); *C02F 1/08* (2013.01); *C02F 1/12* (2013.01); *C02F 2103/08* (2013.01)

(58) Field of Classification Search
CPC .......... B01D 5/0078; C02F 1/042; C02F 1/12; C02F 1/08; C02F 2103/08
See application file for complete search history.

(56) References Cited

U.S. PATENT DOCUMENTS

| | | | | |
|---|---|---|---|---|
| 3,136,707 | A | * | 6/1964 | Hickman ............... B01D 1/225 159/24.1 |
| 3,271,271 | A | * | 9/1966 | Watt ...................... B01D 3/12 159/6.2 |
| 3,398,548 | A | * | 8/1968 | Bruce ................. B01D 1/2887 62/124 |
| 3,764,483 | A | | 10/1973 | Tleimat |
| 3,795,587 | A | | 3/1974 | James |
| 4,094,170 | A | | 6/1978 | Kantor |
| 4,269,663 | A | * | 5/1981 | McFee ..................... B01D 3/02 202/185.3 |
| 4,462,909 | A | * | 7/1984 | Kennel .................. B01D 21/14 210/525 |
| 4,832,114 | A | | 5/1989 | Yeh |
| 4,859,090 | A | | 8/1989 | Smith |
| 4,966,226 | A | | 10/1990 | Hamburgen |
| 5,211,812 | A | * | 5/1993 | Vielberth ............... B01D 1/221 202/172 |
| 5,297,623 | A | | 3/1994 | Ogushi et al. |
| 5,409,576 | A | | 4/1995 | Tleimat |
| 5,441,102 | A | | 8/1995 | Burward-Hoy |
| 5,529,115 | A | | 6/1996 | Paterson |
| 5,810,975 | A | * | 9/1998 | Bourdel ................. B01D 1/225 159/11.3 |
| 5,878,808 | A | | 3/1999 | Rock et al. |
| 6,050,333 | A | * | 4/2000 | Albaroudi ............. F28D 11/025 165/104.27 |
| 6,111,748 | A | | 8/2000 | Bhatia |
| 6,241,009 | B1 | | 6/2001 | Rush |
| 6,408,937 | B1 | | 6/2002 | Roy |
| 6,668,911 | B2 | | 12/2003 | Bingler |
| 6,839,234 | B2 | | 1/2005 | Niwatsukino et al. |
| 7,055,581 | B1 | | 6/2006 | Roy |
| 7,224,585 | B2 | | 5/2007 | Lee et al. |
| 7,262,967 | B2 | | 8/2007 | Crocker et al. |
| 7,424,906 | B2 | | 9/2008 | Bhatti et al. |
| 7,427,336 | B2 | | 9/2008 | Zebuhr |
| 7,438,120 | B2 | | 10/2008 | Hong et al. |
| 7,481,263 | B2 | | 1/2009 | Breier et al. |
| 7,527,085 | B2 | | 5/2009 | Lijima et al. |
| 7,980,078 | B2 | | 7/2011 | McCutchen et al. |
| 8,944,150 | B2 | | 2/2015 | Wang |
| 9,207,023 | B2 | | 12/2015 | Koplow |
| 2002/0066283 | A1 | | 6/2002 | Oh et al. |
| 2002/0101717 | A1 | | 8/2002 | Lin |
| 2003/0159458 | A1 | | 8/2003 | Fang et al. |
| 2003/0209419 | A1 | * | 11/2003 | Tonkin ................. B01D 61/362 203/10 |
| 2003/0213585 | A1 | | 11/2003 | Reznik |
| 2004/0052049 | A1 | | 3/2004 | Wu et al. |
| 2005/0024830 | A1 | | 2/2005 | Lee et al. |
| 2005/0205408 | A1 | | 9/2005 | Marsh et al. |
| 2007/0089859 | A1 | | 4/2007 | Wei |
| 2007/0144199 | A1 | | 6/2007 | Scott |
| 2007/0204633 | A1 | * | 9/2007 | Whisson .............. B01D 5/0015 62/93 |
| 2008/0142195 | A1 | | 6/2008 | Erturk et al. |
| 2010/0025015 | A1 | | 2/2010 | Wang |
| 2010/0025021 | A1 | | 2/2010 | Wang |
| 2010/0053884 | A1 | | 3/2010 | Hung et al. |
| 2012/0037488 | A1 | | 2/2012 | Zebuhr |
| 2012/0279685 | A1 | | 11/2012 | Yu |
| 2016/0129367 | A1 | | 5/2016 | Wang |

FOREIGN PATENT DOCUMENTS

| | | | | |
|---|---|---|---|---|
| CN | 1408647 | A | | 4/2003 |
| CN | 1652328 | A | | 8/2005 |
| CN | 101043806 | A | | 9/2007 |
| CN | 101053697 | A | | 10/2007 |
| CN | 101646327 | A | | 2/2010 |
| CN | 101646328 | A | | 2/2010 |
| CN | 201658856 | U | | 12/2010 |
| CN | 101936668 | A | | 1/2011 |
| CN | 201945200 | U | | 8/2011 |
| FR | 2452302 | A1 | * | 10/1980 .......... B01D 5/0066 |
| FR | 2452302 | A1 | * | 10/1980 |
| GB | 1355933 | A | | 6/1974 |
| GB | 1505674 | | * | 4/1975 |
| JP | 60253790 | A | | 12/1985 |
| JP | 2006281083 | A | | 10/2006 |
| JP | 2007064532 | A | | 3/2007 |
| WO | 9505227 | A1 | | 2/1995 |
| WO | 0187462 | A1 | | 11/2001 |
| WO | 2004094932 | A1 | | 11/2004 |
| WO | 2009073929 | A1 | | 6/2009 |
| WO | 2011004416 | A1 | | 1/2011 |
| WO | 2012012397 | A2 | | 1/2012 |

OTHER PUBLICATIONS

FR2452302A1 Eng [Menguy, G. (1980). Espacenet translation obtained Oct. 5, 2017] (Year: 1980).*
Multiple-effect distillation, accessed at http://web.archive.org/web/20111117012825/http://en.wikipedia.org/wiki/Multiple-effect_distillation, last modified on Sep. 11, 2011, pp. 3.
Wiper System, accessed at http://web.archive.org/web/20130302074221/http://www.uic-gmbh.de/en/basics/wiper-system.html, accessed on Dec. 2, 2015, pp. 2.
International Search Report and Written Opinion for International Application No. PCT/CN2013/076316 dated Mar. 6, 2014.
International Search Report and Written Opinion for International Application No. PCT/CN2011/072909 dated Jan. 12, 2012.
Wang et al., Numerical investigation of heat and mass transfer from an evaporating meniscus in a heated open groove, International Journal of Heat and Mass Transfer, vol. 54, Issue 13-14, pp. 3015-3023 (Jun. 2011).
Wang et al., Transport from a volatile meniscus in a microtube, International Journal of Heat and Mass Transfer, vol. 51, Issue 11-12, pp. 3007-3017 (Jun. 2008).
International Search Report and Written Opinion for International Application No. PCT/CN2013/076307 dated Mar. 6, 2014, pp. 8.
International Search Report and Written Opinion for International application No. PCT/CN2013/076304, dated Mar. 13, 2014.

* cited by examiner

EVAPORATION-CONDENSATION SYSTEMS AND METHODS FOR THEIR MANUFACTURE AND USE

CLAIM OF PRIORITY

This application is a U.S. national stage filing under 35 U.S.C. § 371 of International Application No. PCT/CN2013/076304 filed on May 28, 2013 entitled "EVAPORATION-CONDENSATION SYSTEMS AND METHODS OF MANUFACTURING AND USING THE SAME," which is incorporated herein by reference in its entirety.

BACKGROUND

Systems and methods for large-scale desalination of seawater has been of particular interest in recent years, and many developments surrounding evaporation-condensation systems have sought to improve performance of the desalination process. However, despite the developments, several issues are still present.

Three such issues with desalination with an evaporation-condensation system include inefficient heat exchange through the various chambers in the evaporation-condensation system, the presence of non-condensable gases that form on the condensing surfaces, and the presence of fouling material on the heat transfer surfaces. The presence of any of these issues may contribute to a significant decrease in heat transfer efficiency and low conductivity.

SUMMARY

In an embodiment, evaporation-condensation systems may include a condensation surface having one or more wipers and a gas diffusion apparatus. The one or more wipers may be configured to move over the condensation surface to displace one or more of fouling material and condensed material that may be present on the condensation surface. The gas diffusion apparatus may include one or more anti-gas blades positioned substantially parallel to the condensation surface and one or more gas storage areas. The gas diffusion apparatus may be configured to guide an amount of vapor molecules towards the condensation surface and promote condensation of the vapor molecules by rotating the one or more anti-gas blades around a central axis and displacing an amount of non-condensable gas into the one or more gas storage areas.

In an embodiment, evaporation-condensation systems may include a first evaporation surface configured to receive a first fluid, one or more first spreaders configured to move over the first evaporation surface in contact with at least a portion of the first fluid to generate a thin film of the first fluid on the first evaporation surface, a heat supply unit operably connected to the first evaporation surface, and a first condensation surface having one or more first wipers. The heat supply unit may be configured to heat the first fluid, causing the first fluid to transform to a first amount of vapor molecules, and the one or more first wipers may be configured to move over the first condensation surface to displace fouling material that may be present on the first condensation surface. The evaporation-condensation system may also include a first gas diffusion apparatus having one or more first gas storage areas. The first gas diffusion apparatus may be configured to guide the first vapor molecules from the first evaporation surface towards the first condensation surface and promote condensation of the first vapor molecules by displacing a first amount of non-condensable gas into the one or more first gas storage areas. The evaporation-condensation system may also include a second evaporation surface positioned in thermal communication with the first condensation surface. The second evaporation surface may be configured to receive a second fluid and heat the second fluid with heat generated by condensation of the first vapor molecules, causing the second fluid to transform to a second amount of vapor molecules. The evaporation-condensation system may also include one or more second spreaders configured to move over the second evaporation surface in contact with at least a portion of the second fluid to generate a thin film of the second fluid on the second evaporation surface and a second condensation surface having one or more second wipers. The one or more second wipers may be configured to move over the second condensation surface to displace fouling material that may be present on the second condensation surface. The evaporation-condensation system may also include a second gas diffusion apparatus having one or more second gas storage areas. The second gas diffusion apparatus may be configured to guide the second vapor molecules from the second evaporation surface towards the second condensation surface and promote condensation of the second vapor molecules by displacing a second amount of non-condensable gas into the one or more second gas storage areas. The evaporation-condensation system may also include a preheating apparatus configured to receive a cold fluid and heat the cold fluid with heat obtained from the condensation of the second vapor molecules to be used as one or more of the first fluid and the second fluid.

In an embodiment, methods of manufacturing an evaporation-condensation system may include providing a condensation surface configured to facilitate condensation of vapor molecules thereon, arranging one or more wipers on the condensation surface, and arranging a gas diffusion apparatus adjacent to the condensation surface. The one or more wipers may be configured to move over the condensation surface to displace fouling material that may be present on the condensation surface. The gas diffusion apparatus may include one or more gas storage areas and may be configured to guide an amount of vapor molecules towards the condensation surface and promote condensation of the vapor molecules by displacing an amount of non-condensable gas into the one or more gas storage areas.

In an embodiment, methods of manufacturing an evaporation-condensation system may include providing a first evaporation surface configured to evaporate a first fluid placed thereon and positioning one or more first spreaders on the first evaporation surface. The one or more first spreaders may be configured to move over the first evaporation surface in contact with at least a portion of the first fluid to generate a first thin film of the first fluid on the first evaporation surface. The method may also include attaching a heat supply unit to the first evaporation surface. The heat supply unit may be configured to heat the first fluid, causing the first fluid to transform to a first plurality of vapor molecules. The method may also include providing a first condensation surface configured to facilitate condensation of the first plurality of vapor molecules thereon and arranging a first gas diffusion apparatus between the first evaporation surface and the first condensation surface. The first gas diffusion apparatus may include one or more first gas storage areas and is configured to guide the first plurality of vapor molecules towards the first condensation surface and promote condensation of the first plurality of vapor molecules by displacing a first amount of non-condensable gas into the one or more first gas storage areas. The method may also include arranging one or more first wipers on the first condensation surface. The one or more first wipers may be configured to move over the first condensation surface to displace fouling material that may be present on the first condensation surface. The method may also include arranging a second evaporation surface in thermal communication with the first condensation surface. The second evaporation surface may be configured to obtain heat released from the first condensation surface to heat a second fluid placed thereon, thereby transforming the second fluid to a second plurality of vapor molecules. The method may also include positioning one or more second spreaders on the second evaporation surface. The one or more second spreaders may be configured to move over the second evaporation surface in contact with at least a portion of the second fluid to generate a second thin film of the second fluid on the second evaporation surface. The method may also include providing a second condensation surface configured to facilitate condensation of the second plurality of vapor molecules thereon and arranging a second gas diffusion apparatus between the second evaporation surface and the second condensation surface. The second gas diffusion apparatus may include one or more second gas storage areas and may be configured to guide the second plurality of vapor molecules towards the second condensation surface and promote condensation of the second plurality of vapor molecules by displacing a second amount of non-condensable gas into the one or more second gas storage areas. The method may also include arranging one or more second wipers on the second condensation surface. The one or more second wipers may be configured to move over the second condensation surface to displace fouling material that may be present on the second condensation surface.

In an embodiment, a method of operating an evaporation-condensation system may include providing a condensation surface configured to facilitate condensation of vapor molecules thereon. The condensation surface may include one or more wipers. The method may also include positioning a gas diffusion apparatus substantially adjacent to the condensation surface. The gas diffusion apparatus may include one or more gas storage areas. The method may also include providing a source of vapor through the gas diffusion apparatus, guiding the vapor molecules through the gas diffusion apparatus towards the condensation surface, displacing an amount of non-condensable gas into the one or more gas storage areas, and rotating the one or more wipers about a center axis on the condensation surface to displace fouling material that may be present on the condensation surface.

In an embodiment, condensation surfaces configured to promote condensation of vapor molecules may include one or more wipers configured to rotate around a central axis to displace fouling material that may be present on the condensation surface. The one or more wipers may have a curved shape and may extend from the central axis to a boundary area that corresponds to an area outside the condensation surface. The boundary area may have a fouling material container configured to receive and store the fouling material as it is displaced by the one or more wipers.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Figure 1:
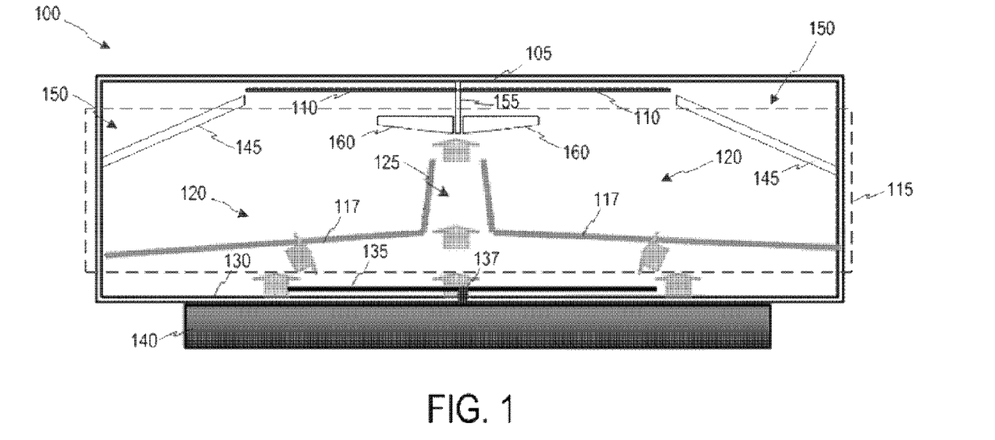
FIG. 1 depicts a side cross-sectional view of an evaporation-condensation system according to an embodiment.

FIG. 1 depicts a side cross-sectional view of an evaporation-condensation system, generally designated 100, according to an embodiment. The evaporation-condensation system 100 may generally be a chamber having a condensation surface 105 and a gas diffusion apparatus 115. The chamber may be any size or shape suitable for evaporation and condensation, and may further be constructed of any materials. In some embodiments, at least a portion of the materials used in chamber construction may be thermal resistant. In other embodiments, at least a portion of the materials used in chamber construction may not be thermal resistant. In some embodiments, the materials used in chamber construction may be made of a material that can be pressurized. The evaporation-condensation system 100 disclosed herein may be any evaporation-condensation system and/or components thereof now known or later developed, and is not limited by this disclosure. Specific examples of evaporation-condensation systems may include heat pipes, vapor chambers, condensers, capillary-pumped loops, desalination systems, distillation systems, separation systems, and the like.

In various embodiments, the condensation surface 105 may generally be used to effect condensation of liquid from vapor located within the evaporation-condensation system 100, as described in greater detail herein. In some embodiments, the condensation surface 105 may be configured to release heat when it is contacted by vapor molecules. The heat may be used as a heat source for other components, whether or not specifically enumerated herein, as a heat source for an evaporation surface in another evaporation-condensation system, and/or the like. The condensation surface 105 is not limited by shape or size, and may be any shape or size suitable for condensation surfaces. In some embodiments, the condensation surface 105 may be substantially circular or ring-shaped to facilitate removal of unwanted objects from the surface, as will be discussed in greater detail herein.

In various embodiments, the condensation surface 105 may include one or more wipers 110 disposed on the surface thereof. In particular embodiments, the condensation surface 105 may have about 1 wiper to about 8 wipers, or any value or range therebetween. In some embodiments, the one or more wipers 110 may be positioned within a distance of the condensation surface 105 such that the wipers are in contact with at least a portion of fouling material and/or the like that may be present on the condensation surface. Specific examples of the distance may include about 0 mm to about 1 mm. More particularly, the distance may be about 0 mm, about 0.001 mm, about 0.01 mm, about 0.1 mm, about 0.5 mm, about 1 mm, or any value or range between any two of the values. In some embodiments, the one or more wipers 110 may generally be configured to move over the condensation surface to displace the fouling material that may be present on the condensation surface 105. While the term fouling material is used herein, it is understood that any objects, debris, materials, and/or the like is included, particularly objects that include material that may hinder or prevent condensation, thus decreasing the efficiency of the evaporation-condensation system 100. Specific examples may include condensed material, brine, salt, dust, and/or the like.

Figure 3:
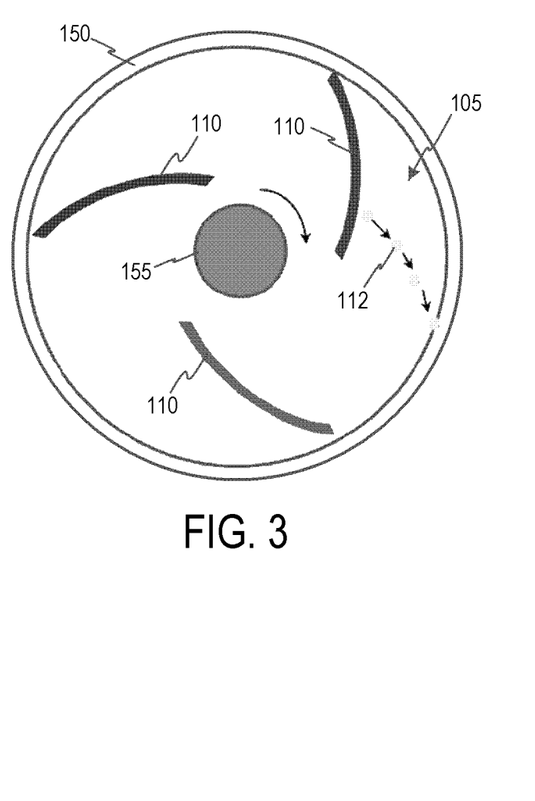
FIG. 3 depicts a top cross-sectional view of the one or more wipers in an evaporation-condensation system according to an embodiment.

In some embodiments, as also depicted in FIG. 3, the one or more wipers 110 may rotate around a central axis 155 to displace objects from the condensation surface 105. The one or more wipers 110 may rotate at a revolution rate of about 5 revolutions per minute (RPM) to about 500 RPM. Specific examples of revolution rates may include about 5 RPM, about 10 RPM, about 25 RPM, about 50 RPM, about 100 RPM, about 250 RPM, about 500 RPM, or any value or range between any two of the values. In other embodiments, the one or more wipers 110 may move in a back and forth direction over the condensation surface 105 to remove fouling material. In some embodiments, the one or more wipers 110 may be substantially evenly distributed upon the condensation surface 105, such as, for example, evenly distributed about the central axis 155.

Figure 4:
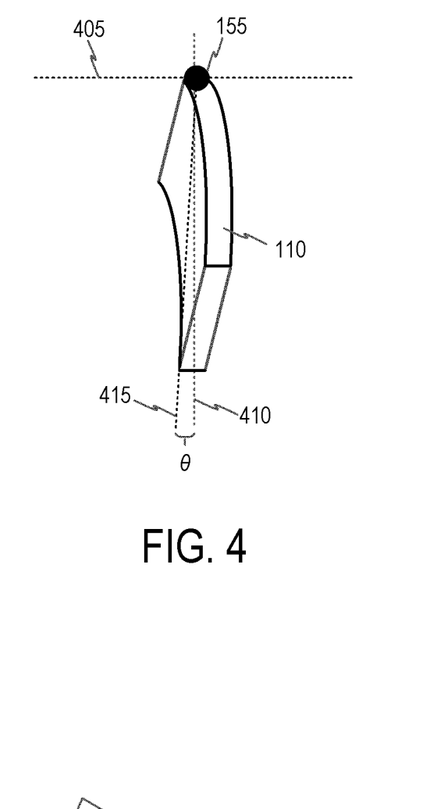
FIG. 4 depicts a top perspective view of a wiper in an evaporation-condensation system according to an embodiment.

The one or more wipers 110 may displace objects by moving the objects into a boundary area 150. For example, the one or more wipers 110 may be sufficiently curved so that when they advance around the central axis 155, they may push the objects (as indicated by element 112 in FIG. 3) in an outward direction away from the center of the condensation surface 105 until the objects drop into the boundary area 150. As also depicted in FIG. 4, in various embodiments, each of the wipers 110 may have a longitudinal axis 410 with respect to a plane 405 that is substantially perpendicular to the condensation surface 105. The longitudinal axis 410 may extend from the central axis 155 through the center of the wiper to the boundary area. Each wiper 110 may be pitched at an angle θ along the longitudinal axis 410 with respect to the plane, i.e., between 410 and 415. In some embodiments, the angle θ may be about 5° to about 60°. In particular embodiments, the angle θ may be about 5°, about 10°, about 15°, about 20°, about 25°, about 30°, about 40°, about 50°, about 60°, or any value or range between any two of these values.

In various embodiments, the boundary area 150 may generally be a storage area that is located outside the condensation surface 105. In some embodiments, the boundary area 150 may surround at least a portion of the condensation surface 105. In particular embodiments, the boundary area 150 may surround the entire condensation surface 105. The boundary area 150 may be defined by one or more fouling material containers 145 that are configured to store the fouling material as it is removed from the condensation surface by the one or more wipers 110. In some embodiments, the boundary area 150 and/or the one or more fouling material containers 145 may include one or more means for removal of collected fouling material after a period of time, such as when the boundary area and/or the one or more fouling material containers become full and are no longer able to collect additional fouling material.

Figure 6:
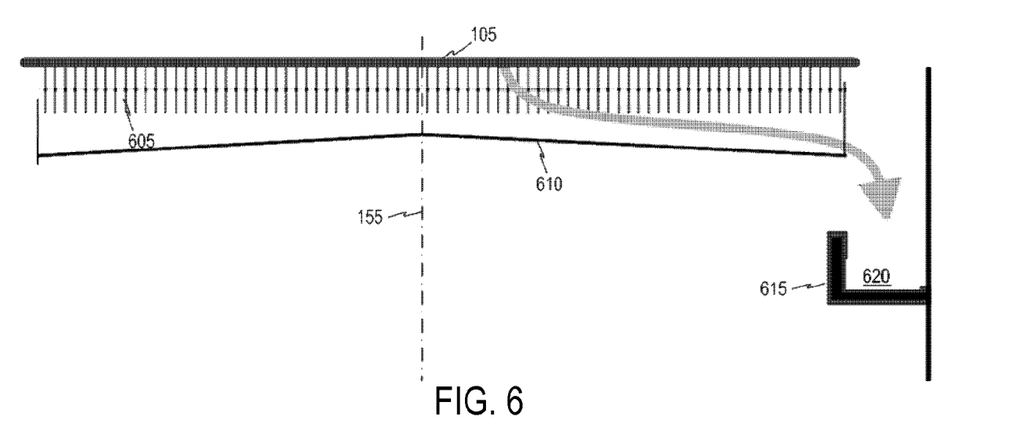
FIG. 6 depicts a detailed side view of a system for collecting condensate according to an embodiment.

In various embodiments, the condensation surface 105 may include a collecting brush 605, as depicted in FIG. 6. In some embodiments, the collecting brush 605 may be used instead of the one or more wipers 110 (FIG. 1). In other embodiments, the collecting brush 605 may be used in addition to the one or more wipers 110 (FIG. 1). The collecting brush 605 may be positioned generally in contact with the condensation surface 105 in a manner to allow the collecting brush to collect condensate 620 from the condensation surface. To effect collection, the collecting brush 605 may generally rotate around the central axis 155 to dislodge the condensate 620 from the condensation surface 105 and move the condensate under gravitational and/or centrifugal force to one or more condensate reservoirs 615. In some embodiments, a guiding groove 610 may be positioned underneath the collecting brush 605 so that the collecting brush is located between the guiding groove and the condensation surface 105. The guiding groove 610 may provide additional guiding for the condensate 620 to ensure that substantially all of the condensate removed from the condensation surface 105 by the collecting brush 605 is deposited into the condensate reservoirs 615. In some embodiments, the guiding groove 610 may have a J-shaped cross section. In some embodiments, the guiding groove 610 may be tilted at a downwards angle to allow the condensate 620 to roll down the guiding groove. In some embodiments, the condensate reservoirs 615 may be configured to hold a volume of condensate 620. In some embodiments, the condensate reservoirs 615 may be connected to a means for transporting the condensate 620 to other components, whether or not specifically enumerated herein. In some embodiments, the condensate reservoirs 615 may be connected to a means for transporting the condensate 620 to one or more external devices. In some embodiments, the condensate reservoirs 615 may be affixed to an inside surface of the evaporation-condensation system 100 (FIG. 1).

Referring back to FIG. 1, in various embodiments, the gas diffusion apparatus 115 may include one or more anti-gas blades 160 and one or more gas storage areas 120. Generally, the one or more anti-gas blades 160 may guide the vapor molecules towards the condensation surface 105 and may displace an amount of non-condensable gas into the one or more gas storage areas 120.

Figure 5:
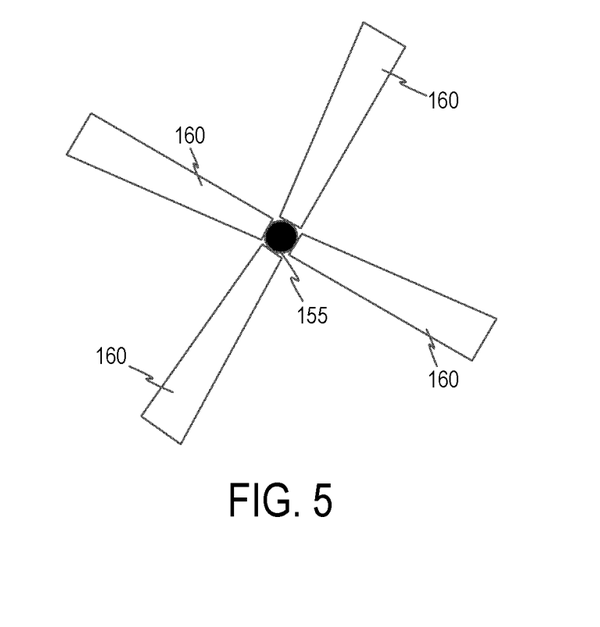
FIG. 5 depicts a top cross-sectional view of a plurality of anti-gas blades in an evaporation-condensation system according to an embodiment.

In various embodiments, the anti-gas blades 160 may be positioned substantially parallel to the condensation surface 105 and may rotate around the central axis 155 in a substantially fan-like manner, as depicted in FIG. 5. While FIG. 1 depicts the anti-gas blades as being substantially closer to the condensation surface, those skilled in the art will recognize that they can be located at any location within the evaporation-condensation system 100 without departing from the scope of this disclosure. In some embodiments, each of the anti-gas blades 160 may be positioned at an angle to effect an upwards force of vapor molecules towards the condensation surface 105, which may increase the momentum and/or velocity of the vapor molecules towards the condensation surface. In some embodiments, each of the anti-gas blades 160 may further be positioned at an angle to effect displacement of at least a portion of an impinging flow of the non-condensable gas into the one or more gas storage areas 120. The non-condensable gas is not limited by this disclosure, and may be any type of non-condensable gas that may accumulate on the condensation surface 105. Specific examples of non-condensable gas may include nitrogen, hydrogen, oxygen, carbon dioxide, helium, and the like, as well as combinations thereof. Based on the theory of interfacial mass transport, only the vapor molecules that reach the condensation surface 105 have a chance to condense, and the amount of the vapor molecules is expressed by Equation (1):

$$j = \Gamma(a)\left(\sqrt{\frac{M}{2\pi R}}\right)\left(\frac{P}{mT^{1/2}}\right) \quad (1)$$

where P is the vapor pressure, T is the vapor temperature, m is the mass of each vapor molecule, $\overline{M}$ is the molecular weight, $\overline{R}$ is the universal gas constant, and $\Gamma(\alpha)$ is a factor representing the influence of the vapor bulk flow, $\Gamma(\alpha) \approx \alpha \pi^{1/2}$ where $\alpha$ is proportional to the bulk flow velocity towards the interface. When the vapor bulk is moving towards the condensation surface 105, $\Gamma(\alpha)$ is larger and thus more vapor molecules can reach the condensation surface.

In various embodiments, the one or more gas storage areas 120 may generally be defined by one or more anti-gas inserts 117 and/or the inside walls of the evaporation-condensation system 100. The inserts 117 may be any shape and/or size, and thus are not limited by this disclosure. In some embodiments, the inserts 117 may be shaped to funnel the vapor from a large area to a smaller area (e.g., 125) that is focused near the center of the condensation surface 105. The funnel shape of the inserts 117 may additionally act to increase the velocity and/or momentum of the vapor travelling towards the condensation surface 105. In some embodiments, the inserts 117 may extend from one or more inside vertical walls of the evaporation-condensation system and curve or bend upward so that a portion of the inserts may be parallel to the inside vertical walls. The type of material used to create the inserts 117 is not limited by this disclosure, and may be of any material, particularly materials commonly known for use in evaporation-condensation systems and the like.

In various embodiments, the one or more gas storage areas 120 may be configured to receive the non-condensable gas and reduce the concentration of the gas. Reduction of the concentration of the non-condensable gas may be completed by dilution, removal of the non-condensable gas from the gas storage areas 120, and/or the like.

In various embodiments, the evaporation-condensation system 100 may further include an evaporation surface 130. The evaporation surface 130 may be configured to heat a fluid so that it vaporizes. To assist in the vaporization process, the evaporation surface 130 may incorporate one or more spreaders 135 that are configured to move over the evaporation surface to generate a thin film of fluid on the evaporation surface. In some embodiments, the one or more spreaders 135 may be in contact with at least a portion of the evaporation surface to effect spreading of the fluid. Similar to the one or more wipers 110 previously described herein, the one or more spreaders 135 may move over the evaporation surface 130 in a back and forth motion, or may move over the evaporation surface in a circular motion by rotating around a center axis 137. While the center axis 137 of the one or more spreaders 135 is shown to be separate from the center axis 155 of the one or more wipers 110, those skilled in the art will recognize that a single center axis may be used to rotate all of the elements discussed herein without departing from the scope of the present disclosure.

In various embodiments, the evaporation surface 130 may be operably connected to a heat supply unit 140. The heat supply unit 140 is not limited by this disclosure, and may include any device that is capable of generating, receiving, transferring, and/or distributing heat. In some embodiments, the heat supply unit 140 may receive heat from an external source. In some embodiments, the heat supply unit 140 may generate heat using any number of components commonly known to generate heat. In some embodiments, the heat supply unit 140 may be a portion of a second evaporation-condensation system, wherein the heat is received from the condensation surface of the second evaporation-condensation system, as described in greater detail herein. The heat supply unit 140 may provide the evaporation surface 130 with heat necessary for the evaporation surface to convert the fluid to vapor molecules.

In various embodiments, the evaporation surface 130 may also be configured to receive the fluid to be used for vaporization. In some embodiments, the evaporation surface 130 may be connected to an inlet and/or the like (not shown), which provides a fluid source. The inlet may be configured to receive the fluid from other components, from the surrounding environment, from storage tanks, and/or the like and deposit the fluid onto the evaporation surface 130.

In various embodiments, to effect a suitable evaporation and condensation reaction, the gas diffusion apparatus 115 may be positioned substantially between the evaporation surface 130 and the condensation surface 105. Additionally, the evaporation surface 130 may generally be located on a bottom surface of the evaporation-condensation system 100 and the condensation surface 105 may generally be located on a top surface, so as to allow vapor molecules to flow in an upwards direction, condense upon contacting the condensation surface, and then fall under force of gravity, as previously described herein.

In various embodiments, the anti-gas blades 160, the spreaders 135, the wipers 110, and/or the collecting brush 605 (FIG. 6) may, either collectively or individually, be attached to the rotating central axis 155. The rotating central axis 155 may be the same axis for all of the elements or a portion of the elements. In some embodiments, multiple rotating central axes 155 may exist. The rotating central axis 155 may be powered by one or more motors and/or other propulsion devices that are configured to rotate the central axis at a rotational velocity that is suitable for the movement of at least one of the components discussed herein.

Figure 2:
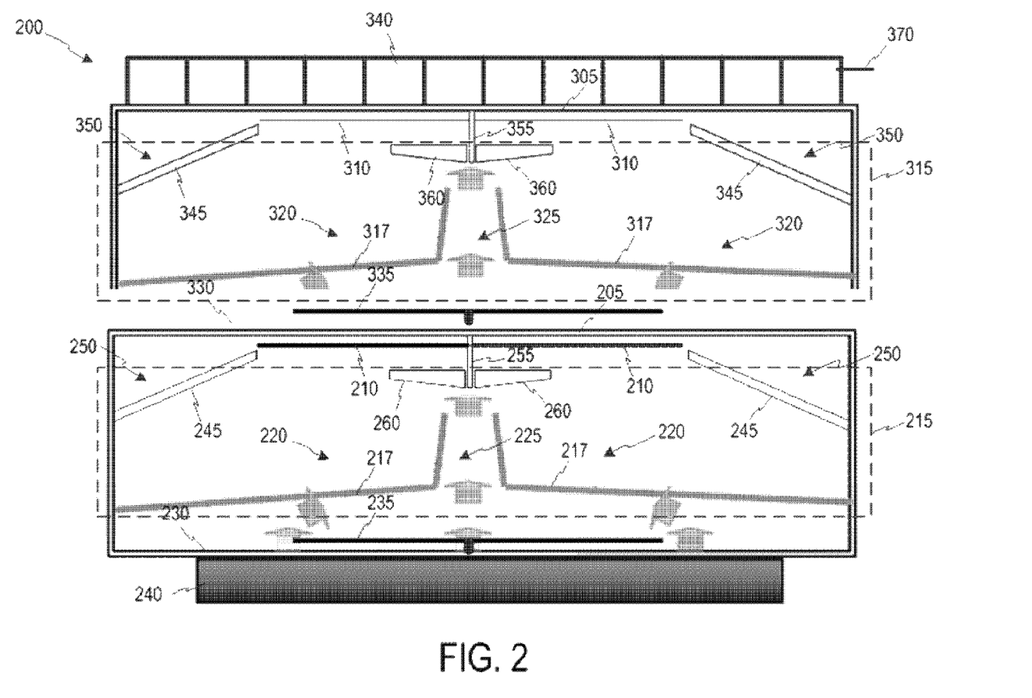
FIG. 2 depicts a side cross-sectional view of another evaporation-condensation system having multiple chambers according to an embodiment.

FIG. 2 depicts a side cross-sectional view of an evaporation-condensation system having multiple chambers, generally designated 200, according to an embodiment. While the present disclosure depicts two chambers, those skilled in the art will recognize that more than two chambers may be used without departing from the scope of this disclosure. In general, the components of the evaporation-condensation system 200 are identical to the system described hereinabove with respect to FIG. 1, but include an additional chamber for evaporation and condensation. Particularly, the evaporation-condensation system 200 may include a first chamber having a first evaporation surface 230, one or more first spreaders 235 attached to the first evaporation surface, a heat supply 240 in communication with the first evaporation surface, a first condensation surface 205 having one or more wipers 210, and a first gas diffusion apparatus 215 having one or more first gas storage areas 220, one or more first anti-gas inserts 217 (including 225), and one or more first anti-gas blades 260. Additionally, the evaporation-condensation system 200 may also include a second chamber having a second evaporation surface 330, one or more second spreaders 335 attached to the second evaporation surface, a second condensation surface 305 having one or more wipers 310, and a second gas diffusion apparatus 315 having one or more second gas storage areas 320, one or more second anti-gas inserts 317 (including 325), one or more second anti-gas blades 360, and a preheating apparatus 340.

As described in greater detail herein, the one or more first spreaders 235 and the one or more second spreaders 335 may generally be configured to move over the respective evaporation surface 230, 330 in contact with at least a portion of the fluid thereon to generate a thin film of fluid on each respective evaporation surface. As also described in greater detail herein, the one or more first wipers 210 and the one or more second wipers 310 may generally be configured to move over the respective condensation surface 205, 305 to displace fouling material that may be present on each respective condensation surface into the respective boundary areas 250, 350 and the respective fouling material containers 245, 345.

In various embodiments, as described in greater detail herein, the first gas diffusion apparatus 215 and second gas diffusion apparatus 315 may each be positioned between the respective evaporation surfaces 230, 330 and the respective condensation surfaces 205, 305. In some embodiments, the first gas diffusion apparatus 215 and second gas diffusion apparatus 315 may each be configured to guide vapor molecules from the respective evaporation surface 230, 330 towards the respective condensation surface 205, 305. Additionally, the first gas diffusion apparatus 215 and the second gas diffusion apparatus 315 may each be configured to displace non-condensable gas away from each respective condensation surface 205, 305 into each respective gas storage area 220, 320. Each gas diffusion apparatus may use the respective anti-gas blades 260, 360 to aid in completion of these tasks.

As previously described herein, the heat supply unit 240 may be operably connected to the first evaporation surface 230 to effect heating of the fluid located thereon. Heating of the first evaporation surface 230 via the heat supply unit 240 may cause the fluid to vaporize, and the resultant vapor to rise through the first gas diffusion apparatus 215 and condense on the first condensation surface 205. The first condensation surface 205 may be thermally connected to the second evaporation surface 330 in such a manner that the heat released from the condensation of vapor molecules contacting with the first condensation surface is used to provide the heat necessary to heat and vaporize the fluid on the second evaporation surface. Thus, little or no additional energy is needed to heat the second evaporation-condensation chamber. However, in some embodiments, an additional heat supply unit (not shown) may be used to provide a supplemental amount of heat to the second evaporation surface 330. In other embodiments, the heat supply unit 240 may also be operably connected to the second evaporation surface 330 in addition to the first evaporation surface 230. In these embodiments, the heat supply unit 240 may be used to provide a supplemental amount of heat to the second evaporation surface 330. The second evaporation surface 330 may vaporize the fluid, and the resultant vapor may rise through the second gas diffusion apparatus 315 and condense on the second condensation surface 305.

As described in greater detail herein, both the first condensation surface 205 and the second condensation surface 305 may include, respectively, one or more collecting brushes, one or more guiding grooves, and one or more condensate reservoirs (not shown) for removing and collecting condensate from the respective condensation surface. In some embodiments, each condensate reservoir may be attached to an apparatus for removing and transporting the condensate, as previously described herein.

In various embodiments, the second condensation surface 305 may be thermally connected to the preheating apparatus 340 and may be configured to provide heat from the condensation of vapor to the preheating apparatus. In some embodiments, the preheating apparatus 340 may be configured to receive fluid, such as fluid from areas surrounding the evaporation-condensation system 200 from an inlet 370. In some embodiments, the preheating apparatus 340 may be configured to heat the fluid with the heat obtained from the second condensation surface 305. In some embodiments, the preheating apparatus 340 may direct the heated fluid to the first evaporation surface 230 and/or the second evaporation surface 330 to be used in creating additional vapor.

Figure 7:
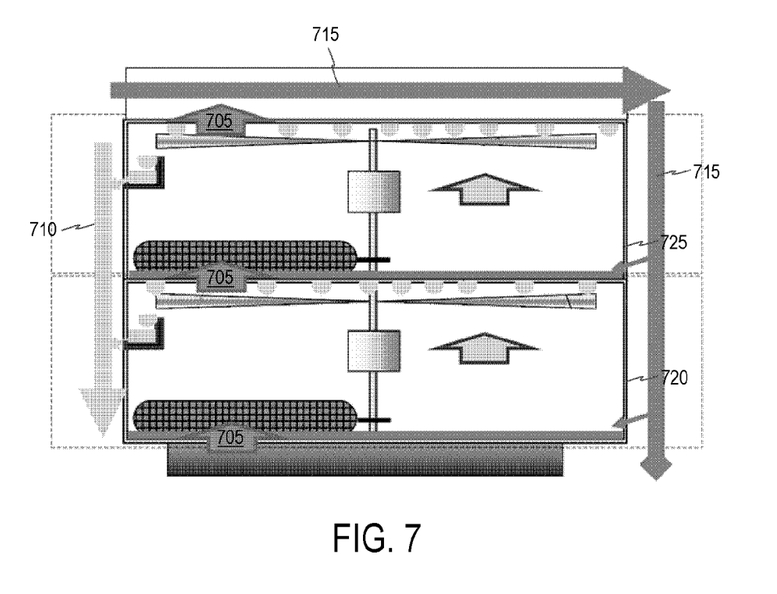
FIG. 7 depicts a diagram of heat and fluid flow in a multiple chamber evaporation-condensation system according to an embodiment.

FIG. 7 depicts a diagram of the movement of fluid and heat in the multiple chamber evaporation-condensation system 200 described in FIG. 2. Heat 705 flows from the heat supply unit up to the first chamber 720 where it is used to heat the first fluid so that it vaporizes and condenses at the top of the first chamber. The heat 705 from the condensation reaction in the first chamber 720 is then used to drive vaporization of fluid in the second chamber 725. The vapor is then condensed in the second chamber, and the heat 705 from the second condensation is used to heat the fluid 715 in the preheating apparatus, which is then returned to one or both of the chambers to repeat the process. The condensed liquid 710 is collected in each chamber and is outputted from the evaporation-condensation system.

Figure 8:
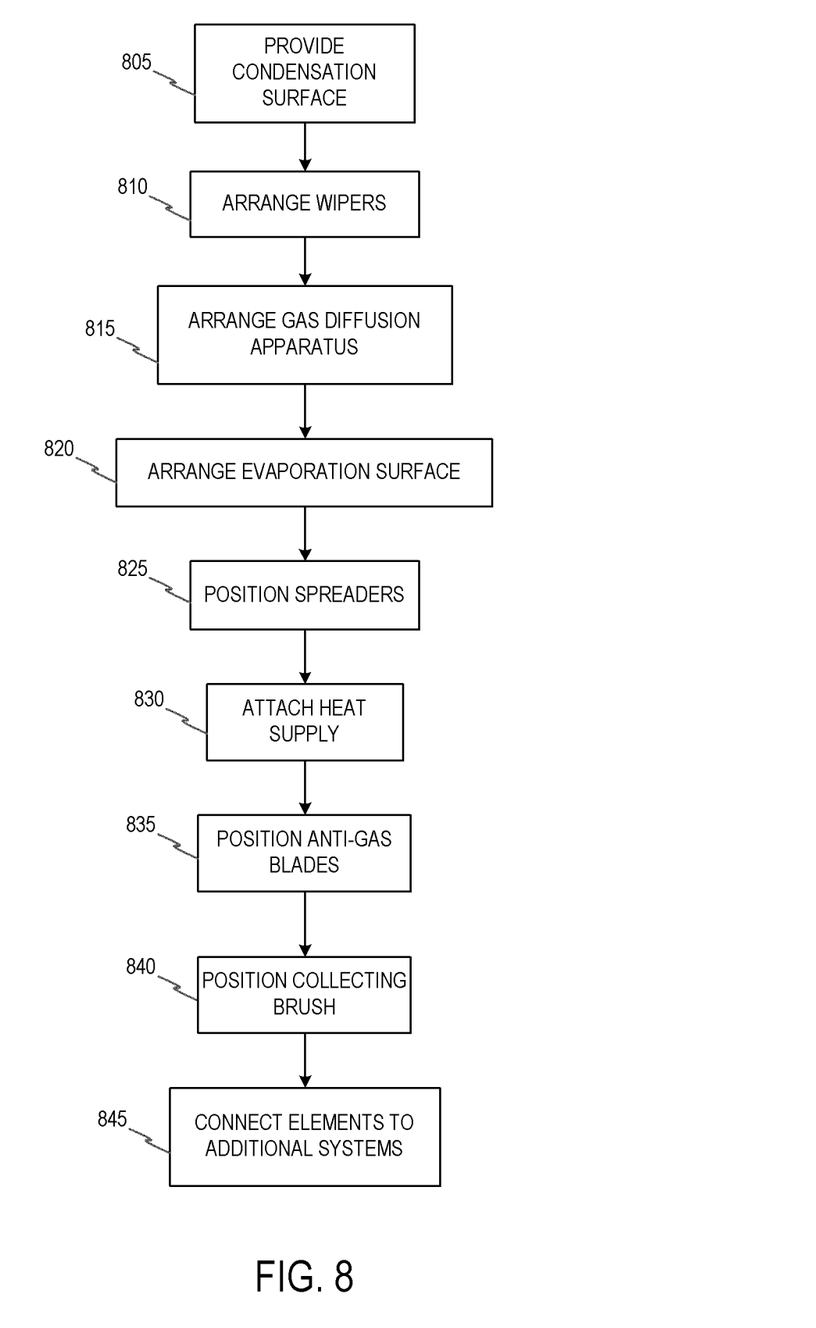
FIG. 8 depicts a flow diagram of a method of manufacturing an evaporation-condensation system according to an embodiment.

FIG. 8 depicts a flow diagram of a method of manufacturing an evaporation-condensation system according to an embodiment. The method described herein is merely illustrative; additional, fewer, and/or alternative processes are contemplated without departing from the scope of the present disclosure. The processes described herein will be described with respect to a user; however, more than one user and/or one or more machines may also conduct the processes.

In an embodiment, the user may provide 805 a condensation surface. In some embodiments, the condensation surface may be configured to facilitate condensation of vapor molecules thereon, as previously described herein.

The user may arrange 810 one or more wipers on the condensation surface. In some embodiments, the one or more wipers may be arranged 810 in a manner that allows them to move over the condensation surface to displace fouling material that may be present on the condensation surface, as described herein. In some embodiments, the one or more wipers may be arranged 810 in contact with at least a portion of the condensation surface and in an evenly distributed pattern about a rotating center axis, as described in greater detail herein.

In various embodiments, the user may arrange 815 the gas diffusion apparatus substantially adjacent to the condensation apparatus. The gas diffusion apparatus may further be arranged 815 in such a manner so as to allow it to guide vapor molecules towards the condensation surface and promote condensation by displacing non-condensable gas into one or more gas storage areas, as described in greater detail herein.

In various embodiments, the user may arrange 820 an evaporation surface adjacent to the gas diffusion apparatus. In some embodiments, the evaporation surface may generally be arranged 820 in such a manner that the gas diffusion apparatus is located between the evaporation surface and the condensation apparatus. In some embodiments, the evaporation surface may be located on the bottom of an evaporation-condensation chamber, the condensation surface on the top, and the gas diffusion apparatus located between. This arrangement may allow for fluid to vaporize, flow up through the gas diffusion apparatus, and then condensate on the condensation surface, as described in greater detail herein. In some embodiments, the user may position 825 one or more spreaders on the evaporation surface. The one or more spreaders may be positioned 825 in such a manner so that they can move over the evaporation surface in contact with at least a portion of the fluid to generate a thin film on the evaporation surface.

In various embodiments, the user may attach 830 a heat supply unit to the evaporation surface. In some embodiments, the heat supply unit may be directly attached 830 to the evaporation surface. In other embodiments, the heat supply unit may be thermally attached 830 to the evaporation surface. In yet other embodiments, the heat supply unit may be located in a remote location and configured to deliver heat to the evaporation surface. In some embodiments, the heat supply may be attached 830 in such a manner so as to allow the heat supply unit to heat the fluid on the evaporation surface to effectively transform the fluid into vapor molecules.

In various embodiments, the user may position 835 one or more anti-gas blades between the condensation surface and the gas diffusion apparatus. In some embodiments, the anti-gas blades may be positioned 835 at an angle in an evenly distributed manner around a central axis and may further be substantially parallel to the condensation surface so that the anti-gas blades facilitate movement of vapor towards the condensation surface and displacement of non-condensable gas into the gas storage areas, as described in greater detail herein.

In various embodiments, the user may position 840 a collecting brush at or near the surface of the condensation surface. In some embodiments, the collecting brush may be positioned 840 in a manner that allows it to move over the condensation surface to collect condensate, and with the help of a guiding groove, deposit the condensate into a condensate reservoir, as described herein.

In various embodiments, the user may connect 845 the elements of the evaporation-condensation system to any other additional systems. Examples of additional systems are not limited by this disclosure, and may include, for example, additional evaporation-condensation systems, heat pipes, vapor chambers, condensers, capillary-looped pumps, desalination systems, distillation systems, separation systems, and/or the like.

Figure 9:
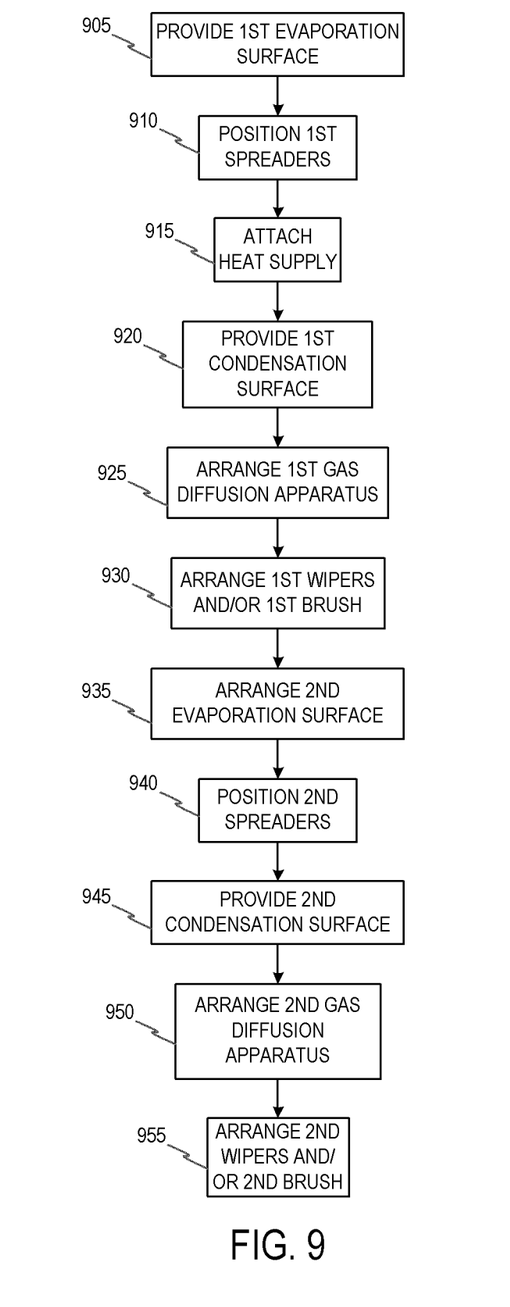
FIG. 9 depicts a flow diagram of a method of manufacturing an evaporation-condensation system having multiple chambers according to an embodiment.

FIG. 9 depicts a flow diagram of a method of manufacturing an evaporation-condensation system having multiple chambers according to an embodiment. The method described herein is merely illustrative; additional, fewer, and/or alternative processes are contemplated without departing from the scope of the present disclosure. The processes described herein will be described with respect to a user; however, more than one user and/or one or more machines may also conduct the processes.

In various embodiments, the user may provide 905 a first evaporation surface on the bottom of a first evaporation-condensation chamber. In some embodiments, the user may position 910 a first set of spreaders on the first evaporation system, as previously described herein. In some embodiments, a heat supply may be attached 915 to the first evaporation surface to provide heat for vaporization of fluid on the first evaporation surface.

In various embodiments, the user may provide 920 a first condensation surface on the top of the first evaporation-condensation chamber and arrange 925 a first gas diffusion apparatus in the first evaporation-condensation chamber. In some embodiments, the first gas diffusion apparatus may be arranged 925 substantially between the first condensation surface and the first evaporation surface, as previously described herein. In some embodiments, the user may arrange 930 a first set of wipers and/or a first collecting brush on the first condensation surface, as previously described herein. In some embodiments, the first collecting brush may be arranged 930 with a guiding groove and/or one or more condensate reservoirs and positioned in such a manner that the first collecting brush can collect condensate from the first condensation surface and deposit the condensate in the condensate reservoirs via the guiding groove, as previously described herein.

In various embodiments, the user may arrange 935 a second evaporation surface on the bottom of a second evaporation-condensation chamber. In some embodiments, the second evaporation surface may be arranged 935 in such a manner that it is connected to the first condensation surface so as to receive the heat released from the first condensation surface for use in heating fluid, as previously described herein. Accordingly, the second evaporation-condensation chamber may be positioned substantially above the first evaporation-condensation chamber. In some embodiments, the user may position 940 a second set of spreaders on the second evaporation system, as previously described herein.

In various embodiments, the user may provide 945 a second condensation surface on the top of the second evaporation-condensation chamber and arrange 950 a second gas diffusion apparatus in the second evaporation-condensation chamber. In some embodiments, the second gas diffusion apparatus may be arranged 950 substantially between the second condensation surface and the second evaporation surface, as previously described herein. In some embodiments, the user may arrange 955 a second set of wipers and/or a second collecting brush on the first condensation surface, as previously described herein. In some embodiments, the second collecting brush may be arranged 955 with a guiding groove and/or one or more condensate reservoirs and positioned in such a manner that the second collecting brush can collect condensate from the second condensation surface and deposit the condensate in the condensate reservoir via the guiding groove, as previously described herein.

In various embodiments, the user may also complete additional steps, such as, for example, placing and arranging additional components, attaching the evaporation-condensation system to other components, and/or the like.

Figure 10:
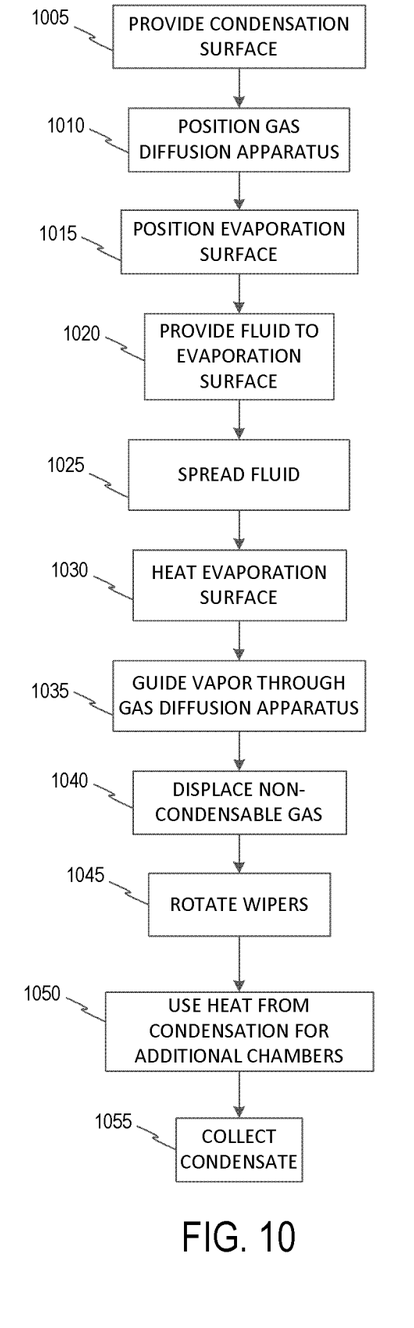
FIG. 10 depicts a flow diagram of a method for operating an evaporation-condensation system according to an embodiment.

FIG. 10 depicts a flow diagram of a method for operating an evaporation-condensation system according to an embodiment. The method described herein is merely illustrative; additional, fewer, and/or alternative processes are contemplated without departing from the scope of the present disclosure. The processes described herein will be described with respect to a user; however, more than one user and/or one or more machines may also conduct the processes.

In various embodiments, the user may provide 1005 a condensation surface configured to facilitate condensation, position 1010 a gas diffusion apparatus configured to direct vapor towards the condensation surface, and position 1015 an evaporation surface configured to vaporize fluid, all of which have previously been described in greater detail herein. In some embodiments, the user may provide 1020 a fluid to the evaporation surface. The user may provide 1020 the fluid from a preheating unit, as described herein, or may provide the fluid from another external location.

In some embodiments, the user may spread 1025 the fluid in a thin film on the evaporation surface, such as through use of one or more spreaders, as described in greater detail herein. The user may also heat 1030 the evaporation surface so that the thin film of fluid is converted to vapor. The spreading 1025 and heating 1030 processes may be completed continuously, so that additional fluid is constantly being converted to vapor.

In various embodiments, the user may guide 1035 the vapor through the gas diffusion apparatus toward the condensation surface, where it may be given additional momentum to reach the condensation surface. In some embodiments, the user may displace 1040 non-condensable gases that travel with the vapor through the use of one or more anti-gas blades and/or one or more gas storage areas, as previously described herein. Displacement 1040 of the non-condensable gases may ensure that a greater amount of vapor is able to condense. In some embodiments, the user may also rotate 1045 one or more wipers located at or near the condensation surface to remove fouling material present on the condensation surface, as described in greater detail herein. Removal of the fouling material may also ensure that a greater amount of vapor is able to condense.

In various embodiments, as the vapor condenses, the user may use 1050 the heat from the condensation to drive evaporation of fluid from other chambers and may collect 1055 the condensate from the condensation surface through the use of a collecting brush, a guiding groove, and/or one or more condensate reservoirs, as described in greater detail herein. In some embodiments, additional steps may also be completed, such as, for example, transmitted the collected condensate to other systems and/or apparatuses.

EXAMPLES

Example 1: Validation of Gas Diffusion Apparatus

A comprehensive computational fluid dynamics (CFD) simulation has been conducted to evaluate the performance of an anti-gas insert in a gas diffusion apparatus. Particularly, software that contains broad physical modeling capabilities needed to model flow, turbulence, heat transfer, and reactions is used to complete the CFD simulation. In this instance, FLUENT flow modeling simulation software (ANSYS Inc., Canonsburg, Pa.) was used. A heat pipe is simulated. The evaporation is at the bottom and the condensation is at the top. The evaporation side temperature is 4K higher than the condensation side temperature. Three cases were simulated for comparison:

Case 1: When the mass fraction of non-condensable gases (NCG) is ideally 0 (there is no NCG in the system), the condensation mass rate of the system is 0.95 grams/second.

Figure 11A:
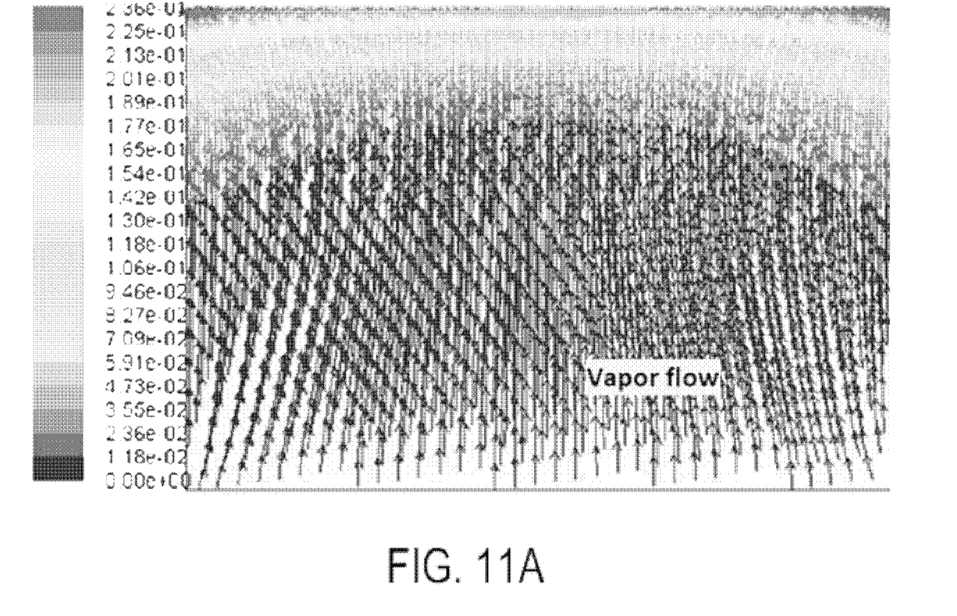
FIGS. 11A and 11B depict a graphical representation of a simulation of an evaporation-condensation system with no gas diffusion apparatus according to an embodiment.
Figure 11B:
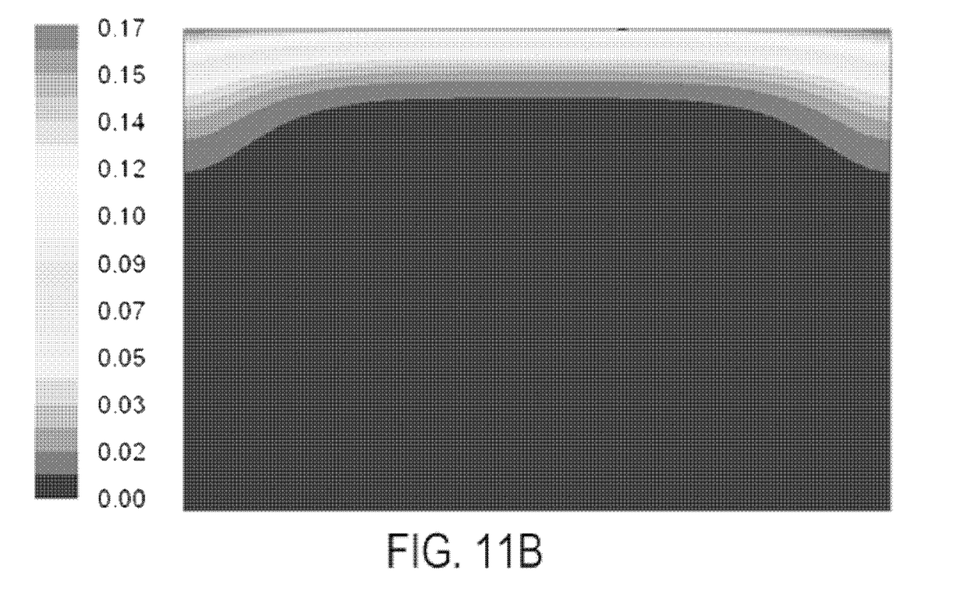

Case 2: When the NCG mass fraction is 1.1%, the condensation rate drops sharply to 0.44 grams/second, a reduction of 54%. The vapor is generated at the evaporation side and flows to the condensing side for condensation. As shown in FIGS. 11A and 11B, a high concentration of NCG is shown in the center and covering the condensation surface, which decreases heat transfer.

Figure 12A:
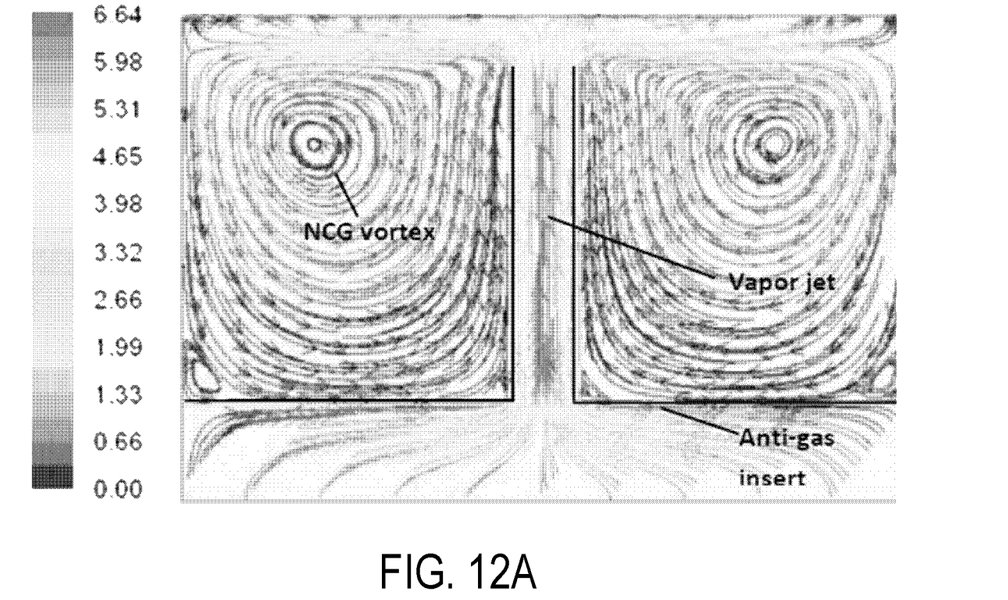
FIGS. 12A and 12B depict a graphical representation of a simulation of an evaporation-condensation system with a gas diffusion apparatus according to an embodiment.
Figure 12B:
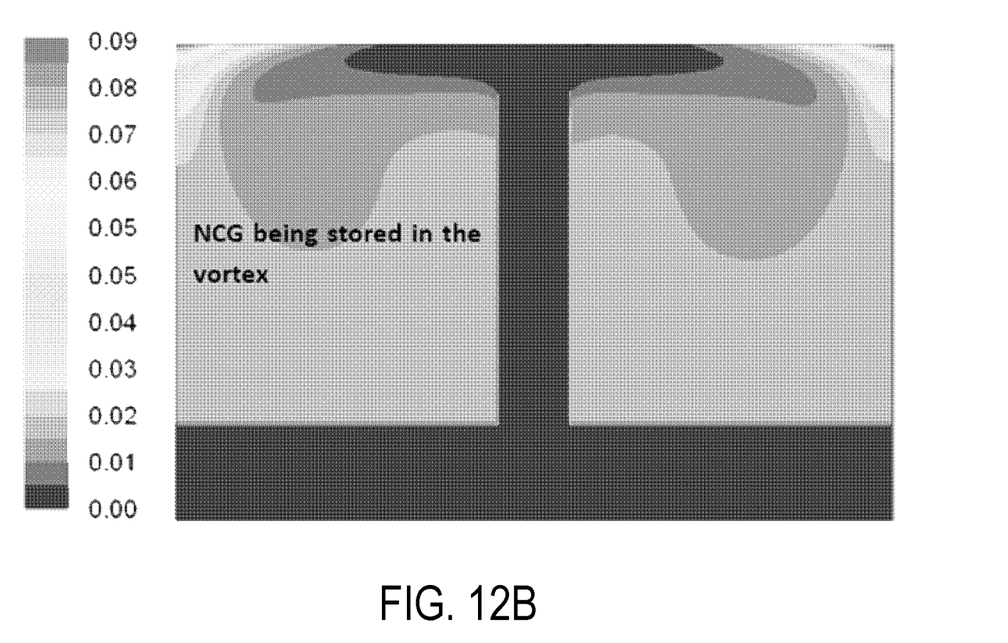

Case 3: The anti-gas insert is introduced in the chamber as shown in FIGS. 12A and 12B. The flow field in the chamber is manipulated by the insert as shown in FIG. 12A. In FIG. 12B, it is shown that the NCG layer near the condensation surface has been prevented. The condensation rate has been enhanced to 0.89 grams/second. Compared to 0.44 grams/second as discovered in Case 2, the heat transfer has been enhanced about 100%.

Example 2: Addition of a Flow Aid

By adding a flow aid such as one or more anti-gas blades to the gas diffusion apparatus shown in Example 1, the heat transfer on the condensation surface can be further increased. The anti-gas blades are positioned as a fan in the center of the system to help with the vapor jet that impinges to the condensing surface. The simulation was completed to evaluate performance of a combination of the anti-gas insert and the flow aid. While the previous simulation was based on 4K temperature difference between the condensing surface (304K) and the evaporating surface (308K), the present simulation is based on a 1K difference between the condensing surface (307K) and the evaporating surface (308K) to make the effect of the flow aid more conspicuous. The results are shown in the table below:

|  | No gas diffusion apparatus | Anti-gas insert only | Anti-gas insert and flow aid | |
|---|---|---|---|---|
| No NCG | 0.254 g/s | | | |
| 1% NCG | 0.1534 g/s | 0.2032 g/s (32% enhancement) | 0.2108 g/s (10 Pa pressure difference, 37% enhancement) | 0.2438 g/s (50 Pa pressure difference, 59% enhancement) |

Example 3: Multiple Chamber System

A multiple chamber system used for desalinating sea water for drinking is arranged so that two substantially cylindrical chambers are stacked on top of each other. Each chamber has a round evaporation surface on the bottom, a condensation surface on the top and a gas diffusion apparatus placed between the two. The condensation surface of the bottom chamber is placed in thermal communication with the evaporation surface of the top chamber, so that heat from the condensation surface can be used by the evaporation surface.

Each of the evaporation surfaces has two spreaders attached to it, with the spreaders rotating around a central axis that is powered by a motor. Each condensation surface has three wipers attached to it, with the wipers also rotating around the central axis. The central axis spans the length of both chambers and is used to power both sets of spreaders. The central axis also has four gas diffusion blades attached to it in the bottom chamber, and four gas diffusion blades attached to it in the top chamber. Both sets of gas diffusion blades are located closer to the respective evaporation surface than the condensation surface. The central axis also has two collection brushes attached at a location where each collection brush is in contact with at least a portion of one condensation surface. Each brush rotates around the condensation surface and collects the condensate, which falls under force of gravity and centrifugal force downwards and outwards along a guiding groove into a condensate reservoir attached around the circumference of the inside vertical wall of each chamber. The condensate reservoir has an exit hatch, which is used to transport the condensate to remote drinking water storage containers.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An evaporation-condensation system comprising:
   a condensation surface having one or more wipers, wherein the one or more wipers are configured to move over the condensation surface to displace one or more of fouling material and condensed material that may be present on the condensation surface; and
   a gas diffusion apparatus comprising:
      one or more anti-gas blades positioned parallel to the condensation surface; and
      one or more gas storage areas,
   wherein the gas diffusion apparatus is configured to guide an amount of vapor molecules towards the condensation surface and promote condensation of the vapor molecules by rotating the one or more anti-gas blades around a central axis and displacing an amount of non-condensable gas into the one or more gas storage areas.

2. The evaporation-condensation system of claim 1, further comprising:
   an evaporation surface configured to receive a fluid; and
   one or more spreaders configured to move over the evaporation surface in contact with at least a portion of the fluid to generate a thin film of the fluid on the evaporation surface.

3. The evaporation-condensation system of claim 2, further comprising a heat supply unit operably connected to the evaporation surface, wherein the heat supply unit is configured to heat the fluid, causing the fluid to transform to the vapor molecules.

4. The evaporation-condensation system of claim 2, wherein the gas diffusion apparatus is positioned between the evaporation surface and the condensation surface and is configured to guide the vapor molecules from the evaporation surface towards the condensation surface.

5. The evaporation-condensation system of claim 1, wherein the one or more wipers each comprise a curved shape and extend from a rotating center axis to a boundary area that corresponds to an area outside the condensation surface.

6. The evaporation-condensation system of claim 5, wherein the one or more wipers are configured to rotate around the rotating center axis.

7. The evaporation-condensation system of claim 6, wherein the one or more wipers are configured to rotate at a revolution rate of about 5 revolutions per minute to about 500 revolutions per minute.

8. The evaporation-condensation system of claim 1, wherein each of the one or more wipers is pitched at an angle of about 5° to about 60° along a longitudinal axis of each wiper with respect to a plane perpendicular to the condensation surface.

9. The evaporation-condensation system of claim 1, wherein the one or more gas storage areas are configured to reduce the concentration of the non-condensable gas.

10. The evaporation-condensation system of claim 1, wherein the evaporation-condensation system is one or more of a heat pipe, a vapor chamber, a condenser, a capillary-pumped loop, a desalination system, a distillation system, and a separation system.

11. The evaporation-condensation system of claim 1, wherein the condensation surface is configured to release heat when contacted by the vapor molecules, wherein the heat is used as a heat source for an evaporation surface in a second evaporation-condensation system.

12. The evaporation-condensation system of claim 1, wherein the non-condensable gas comprises one or more of nitrogen, hydrogen, oxygen, carbon dioxide, and helium.

13. The evaporation-condensation system of claim 1, further comprising a collecting brush positioned in contact with the condensation surface, wherein the collecting brush is configured to collect condensate from the condensation surface and deposit the condensate into one or more condensate reservoirs.

14. The evaporation-condensation system of claim 13, wherein a guiding groove is configured to receive the condensate from the collecting brush and guide the condensate into the one or more condensate reservoirs.

15. A method of manufacturing an evaporation-condensation system, the method comprising:
   providing a condensation surface configured to facilitate condensation of vapor molecules thereon;
   arranging one or more wipers on the condensation surface, wherein the one or more wipers are configured to move over the condensation surface to displace fouling material that is present on the condensation surface; and
   arranging a gas diffusion apparatus adjacent to the condensation surface, wherein the gas diffusion apparatus comprises one or more gas storage areas and is configured to guide an amount of vapor molecules towards the condensation surface and promote condensation of the vapor molecules by displacing an amount of non-condensable gas into the one or more gas storage areas.

16. The method of claim 15, further comprising:
   arranging an evaporation surface adjacent to the gas diffusion apparatus so that the gas diffusion apparatus is positioned between the evaporation surface and the condensation surface and is further configured to guide the vapor molecules from the evaporation surface towards the condensation surface; and
   positioning one or more spreaders on the evaporation surface, wherein the one or more spreaders are configured to move over the evaporation surface in contact with at least a portion of a fluid to generate a thin film of the fluid on the evaporation surface.

17. The method of claim 16, further comprising:
   attaching a heat supply unit to the evaporation surface, wherein the heat supply unit is configured to heat the fluid, causing the fluid to transform to the vapor molecules.

18. The method of claim 15, wherein arranging the one or more wipers comprises arranging the one or more wipers in an evenly distributed pattern about a rotating center axis.

19. The method of claim 15, wherein arranging the one or more wipers comprises positioning the one or more wipers within a distance of the condensation surface such that the one or more wipers are in contact with at least a portion of the fouling material.

20. The method of claim 19, wherein the distance is about 0.01 mm to about 1 mm.

21. The method of claim 15, wherein arranging the one or more wipers comprises arranging each of the one or more wipers at a pitch angle of about 15° along a longitudinal axis of each wiper with respect to a plane perpendicular to the condensation surface.

22. The method of claim 15, further comprising positioning one or more fans at or near the evaporation surface, wherein the one or more fans are configured to aid in displacing the non-condensable gas into the one or more gas storage areas.

23. The method of claim 15, further comprising positioning one or more additional evaporation-condensation systems in thermal communication with the condensation surface, wherein the one or more additional evaporation-condensation systems are configured to obtain heat released from the condensation surface for use in evaporating additional fluid.

\* \* \* \* \*